(12) United States Patent
Tehrani et al.

(10) Patent No.: US 12,110,402 B2
(45) Date of Patent: Oct. 8, 2024

(54) AQUEOUS INKJET INK COMPOSITIONS MADE FROM HIGH VISCOSITY LATEXES

(71) Applicant: Xerox Corporation, Norwalk, CT (US)

(72) Inventors: Sepehr Tehrani, North York (CA); Syed Mohsin Ali, Milton (CA); Carlos Dondon, Mississauga (CA); Biby Esther Abraham, Mississauga (CA); C. Geoffrey Allen, Waterdown (CA); Mihaela Maria Birau, Hamilton (CA); Jennifer L. Belelie, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 848 days.

(21) Appl. No.: 17/230,178

(22) Filed: Apr. 14, 2021

(65) Prior Publication Data

US 2022/0162462 A1    May 26, 2022

Related U.S. Application Data

(63) Continuation-in-part of application No. 17/102,969, filed on Nov. 24, 2020, now abandoned.

(51) Int. Cl.
*C09D 11/30* (2014.01)
*B41J 2/01* (2006.01)
(Continued)

(52) U.S. Cl.
CPC ............ *C09D 11/30* (2013.01); *B41M 5/0023* (2013.01); *C09D 11/02* (2013.01); *C09D 11/107* (2013.01); *B41J 2/01* (2013.01)

(58) Field of Classification Search
CPC ....... C09D 11/30; C09D 11/02; C09D 11/107; B41M 5/0023; B41J 2/01
See application file for complete search history.

(56) References Cited

U.S. PATENT DOCUMENTS 9,371,464 B2    6/2016  Breton et al.
2006/0038867 A1  2/2006  Valentini
(Continued)

FOREIGN PATENT DOCUMENTS

EP    1609827 A1    12/2005
EP    1108758 B1    7/2006
(Continued)

OTHER PUBLICATIONS

"Methacrylates." NOF Europe, nofeurope.com/speciality-chemicals/specialty-monomers/methacrylates/. Accessed Mar. 4, 2024. (Year: 2024).*

(Continued)

*Primary Examiner* — Jennifer A Smith
*Assistant Examiner* — Jeffrey Eugene Barzach
(74) *Attorney, Agent, or Firm* — Bell & Manning, LLC

(57) ABSTRACT

Aqueous inkjet ink compositions are provided. In an embodiment, such an aqueous inkjet ink composition comprises water; resin particles; a colorant; and optionally, a wax. The resin particles comprise a polymerization product of reactants comprising a monomer, an acidic monomer, a hydrophilic monomer, a difunctional monomer, and a reactive surfactant. The acidic monomer, the hydrophilic monomer, and the difunctional monomer may be present at an amount in a range of from about 10 weight % to about 30 weight % in the resin particles. Methods of forming and using the aqueous inkjet ink compositions are also provided.

20 Claims, 2 Drawing Sheets

(51) Int. Cl.
*B41M 5/00* (2006.01)
*C09D 11/02* (2014.01)
*C09D 11/107* (2014.01)

(56) References Cited

U.S. PATENT DOCUMENTS

| | | | |
|---|---|---|---|
| 2006/0199877 A1 | 9/2006 | Ganapathiappan | |
| 2008/0186373 A1 | 8/2008 | Rolly | |
| 2009/0318618 A1 | 12/2009 | Mori | |
| 2010/0003407 A1* | 1/2010 | Ito | C09D 11/32 427/256 |
| 2010/0166985 A1* | 7/2010 | Brockmeyer | C09D 139/04 524/548 |
| 2010/0222472 A1* | 9/2010 | Morimoto | C09D 11/326 524/105 |
| 2011/0242199 A1* | 10/2011 | Nishimura | C09D 11/322 524/502 |
| 2011/0318551 A1 | 12/2011 | Nakagawa | |
| 2013/0079447 A1* | 3/2013 | Koike | C09D 11/106 524/377 |
| 2014/0063113 A1* | 3/2014 | Irving | B41J 2/17553 347/85 |
| 2015/0091973 A1* | 4/2015 | Ikoshi | B41J 2/01 523/205 |
| 2015/0225586 A1 | 8/2015 | Ingle et al. | |
| 2016/0222234 A1* | 8/2016 | Matsuyama | C09D 11/10 |
| 2017/0022380 A1* | 1/2017 | Nakagawa | C09D 11/033 |
| 2018/0311968 A1 | 11/2018 | Sato et al. | |
| 2019/0136077 A1* | 5/2019 | Matsumoto | C08F 2/22 |
| 2019/0249022 A1 | 8/2019 | Ingle et al. | |
| 2019/0367753 A1 | 12/2019 | Chopra et al. | |
| 2022/0162349 A1 | 5/2022 | Tehrani et al. | |
| 2022/0162368 A1 | 5/2022 | Tehrani | |
| 2022/0162461 A1 | 5/2022 | Tehrani et al. | |
| 2022/0380586 A1 | 12/2022 | Lu et al. | |

FOREIGN PATENT DOCUMENTS

| | | |
|---|---|---|
| EP | 2823002 B1 | 5/2016 |
| EP | 3095824 | 11/2016 |
| EP | 1756237 B1 | 5/2017 |
| EP | 3494182 B1 | 4/2020 |
| JP | 2010235895 A | 10/2010 |
| JP | 2018127536 A * | 8/2018 |
| WO | WO 2011/022001 | 2/2011 |
| WO | WO 2014/042651 | 3/2014 |
| WO | WO2014/042653 | 3/2014 |
| WO | WO2018/143957 | 8/2018 |
| WO | WO2018/143959 | 8/2018 |
| WO | WO2018/143962 | 8/2018 |

OTHER PUBLICATIONS

English machine translation of JP-2018127536-A (Year: 2018).*
Extended Search Report on European Application 212097-8/6, dated Apr. 7, 2022.
Product Information for Hitenol BC, Montello, Inc., available from web at https://www.montelloinc.com/hitenol-bc-series-specifications/, as of Feb. 9, 2024.

* cited by examiner

AQUEOUS INKJET INK COMPOSITIONS MADE FROM HIGH VISCOSITY LATEXES

CROSS REFERENCE TO RELATED APPLICATIONS

The present application is a continuation-in-part of U.S. patent application Ser. No. 17/102,969, which was filed on Nov. 24, 2020, the entire contents of which are hereby incorporated by reference.

BACKGROUND

Latexes for aqueous inkjet ink compositions are often synthesized through emulsion polymerization or microemulsion polymerization of hydrophobic monomers in water. The latexes are added to the aqueous inkjet ink compositions along with water, water-dispersible colorants, and hydrophilic solvents. The resin particles of the latex act as a binder which help form a water-impenetrable, polymeric film that protects printed images. However, the resin particles are generally in the form of small rigid spheres. In order to tune the viscosity of the aqueous inkjet ink compositions and to facilitate the formation of thin films therefrom, other water-soluble resins are added to the ink compositions. However, water-soluble resins can induce flocculation and aggregation of resin particles as well as interfere with their electrostatic stability. Water-soluble resins also reduce the water-fastness of images printed from the aqueous inkjet ink compositions.

SUMMARY

The present disclosure provides methods for forming high viscosity latexes. These methods involve unique latex formulations and unique processing steps. The methods are able to achieve latexes having high viscosities as well as high glass transition temperatures ($T_g$). As a result, the resin particles of the latexes are mechanically robust. At the same time, aqueous inkjet ink compositions comprising the latexes readily form high quality films even without any added water-soluble resins. By eliminating the water-soluble resins, images printed from the aqueous inkjet ink compositions exhibit excellent rub/mar-resistance and water-fastness. The high viscosity latexes and aqueous inkjet ink compositions made therefrom are also encompassed by the present disclosure.

Aqueous inkjet ink compositions are provided. In an embodiment, such an aqueous inkjet ink composition comprises water; resin particles; a colorant; and optionally, a wax. The resin particles comprise a polymerization product of reactants comprising a monomer, an acidic monomer, a hydrophilic monomer, a difunctional monomer, and a reactive surfactant. The acidic monomer, the hydrophilic monomer, and the difunctional monomer are present at an amount in a range of from about 10 weight % to about 30 weight % in the resin particles. Methods of forming and using the aqueous inkjet ink compositions are also provided.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

High Viscosity Latex

Figure 1:
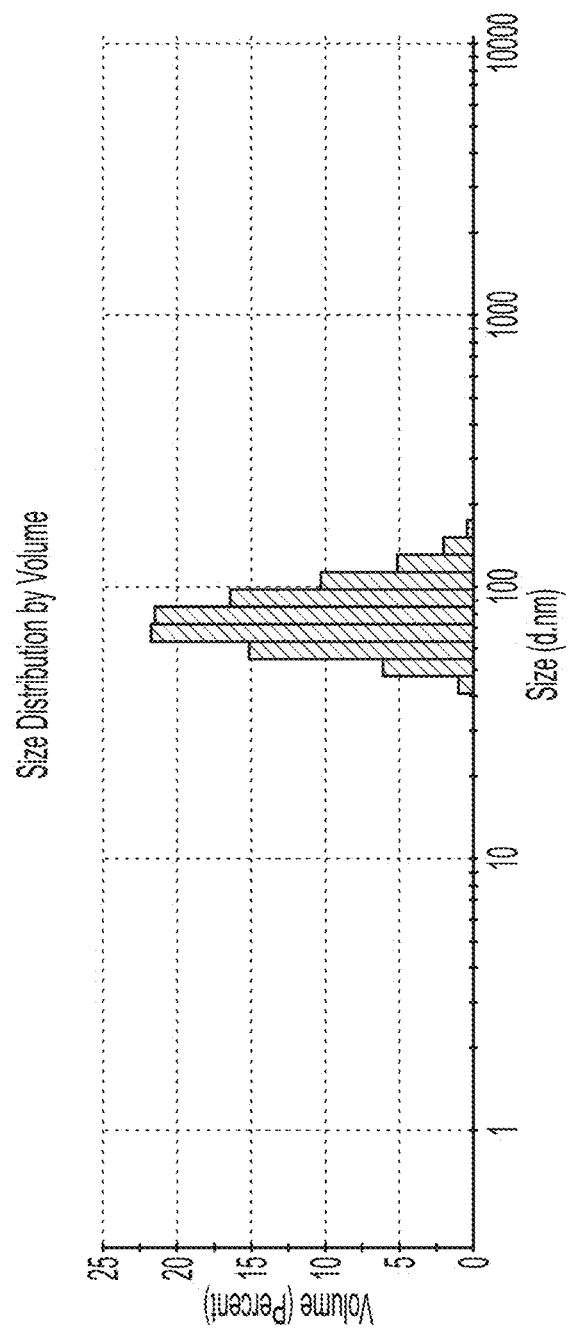
FIG. 1 shows the size distribution of resin particles of a high viscosity latex formed according to an illustrative embodiment of the present methods.

In one aspect, methods for forming a high viscosity latex are provided. The latex comprises resin particles synthesized from certain monomers according to the present methods, which are further described below. The following monomers and combinations thereof may be used (use of "(meth)" as in, e.g., "(meth)acrylate", refers to both acrylate and methacrylate): styrene; alkyl (meth)acrylates, such as, methyl acrylate, ethyl acrylate, butyl acrylate, isobutyl acrylate, dodecyl acrylate, n-octyl acrylate, 2-chloroethyl acrylate, methyl methacrylate, ethyl methacrylate and butyl methacrylate; β-carboxy ethyl acrylate (β-CEA), phenyl acrylate, methyl alphachloroacrylate; butadiene; isoprene; methacrylonitrile; acrylonitrile; vinyl ethers, such as vinyl methyl ether, vinyl isobutyl ether, and vinyl ethyl ether; vinyl esters, such as vinyl acetate, vinyl propionate, vinyl benzoate and vinyl butyrate; vinyl ketones, such as vinyl methyl ketone, vinyl hexyl ketone and methyl isopropenyl ketone; vinylidene halides, such as vinylidene chloride and vinylidene chlorofluoride; N-vinyl indole; N-vinyl pyrrolidone; methacrylate; acrylamide; methacrylamide; vinylpyridine; vinylpyrrolidone; vinyl-N-methylpyridinium chloride; vinyl naphthalene; p-chlorostyrene; vinyl chloride; vinyl bromide; vinyl fluoride; ethylene; propylene; butylenes; and isobutylene. In embodiments, the monomers used to form the resin particles of the latex comprise a styrene and an alkyl acrylate.

Acidic monomers may be used to form the resin particles of the high viscosity latex, including (meth)acrylic acid monomers, sulfonic acid monomers, sulfonate monomers, and combinations thereof. Illustrative acidic monomers include acrylic acid, methacrylic acid, ethacrylic acid, dimethylacrylic acid, maleic anhydride, maleic acid, styrenesulfonic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, and combinations thereof. These acidic monomers also encompass salts thereof, e.g., salt of a sulfonic acid.

In embodiments, two different acidic monomers are used to form the resin particles of the high viscosity latex, each having a different $pK_a$ value. The $pK_a$ values of the two different acidic monomers may differ from one another by at least 2 units, at least 3 units, at least 4 units, or at least 5 units. In embodiments, the two different acidic monomers are present in a monomer emulsion used to form the resin particles at a weight ratio in a range of from 0.1 to 10. This includes a range of from 0.5 to 8 and from 1 to 6. In embodiments, the two different types of acidic monomers used to form the resin particles comprise a methacrylic acid and a sulfonic acid.

Hydrophilic monomers may be used to form the resin particles of the high viscosity latex. The term "hydrophilic monomer" is distinguished from the "acidic monomers" described above. That is, although the selected acidic monomers may also be hydrophilic, these terms refer to different, chemically distinct species of monomers. The hydrophilic monomers are generally monofunctional, i.e., comprising a single polymerizable group. Suitable hydrophilic monomers are those capable of absorbing relatively significant amounts of water via hydrogen bonds formed between water and hydrogen bonding moieties of the hydrophilic monomers. Hydroxyl moieties and glycol moieties are illustrative hydrogen bonding moieties. For example, poly(ethylene glycol)- and poly(propylene glycol)-based hydrophilic monomers are particularly useful as the glycol-containing chains are capable of absorbing significant amounts of water. Suitable hydrophilic monomers are also those that polymerize near the surface of the resin particles such that the hydrogen bonding moieties extend from the surface of the resin particles into a surrounding aqueous medium. Incorporation of the hydrophilic monomers into the resin particles in this way contributes to the high viscosity of the present latexes.

However, it is particularly challenging to incorporate hydrophilic monomers, particularly at the amounts described herein, into resin particles comprising hydrophobic monomers, e.g., styrene, alkyl (meth)acrylate. This is because instead of copolymerizing with the other desired monomers to form the resin particles, the hydrophilic monomers tend to undergo solution polymerization in the surrounding aqueous medium. Moreover, unincorporated hydrophilic monomers tend to leach out of resin particles into the aqueous media of aqueous inkjet ink compositions over time. The present disclosure is based on the unique latex formulations and latex processing steps disclosed herein which address these challenges.

As noted above, illustrative hydrophilic monomers include those comprising hydroxyl moieties, such as hydroxyethyl (meth)acrylate, n-hydroxyethyl (meth)acrylamide, hydroxypropyl (metha)crylate, and hydroxypropyl (meth)acrylamide. Other illustrative hydrophilic monomers include those comprising glycol moieties, such as ethylene glycol (meth)acrylate and propylene glycol (meth)acrylate. Poly(ethylene glycol) (meth)acrylate and poly(propylene glycol) (meth)acrylate are other examples. In embodiments, the hydrophilic monomer is poly(ethylene glycol) (meth) acrylate having a molecular weight in a range of from 185 g/mol to 1500 g/mol. This includes a range of from 360 g/mol to 1500 g/mol, and from 500 g/mol to 1000 g/mol. In embodiments, the hydrophilic monomer is poly(propylene glycol) (meth)acrylate having a molecular weight in a range of from 260 g/mol to 1000 g/mol. This includes a range of from 360 g/mol to 1000 g/mol, and from 500 g/mol to 1000 g/mol. These molecular weight values may be determined using gel permeation chromatography. It has been found that the types of hydrophilic monomers described herein are particularly useful for achieving the viscosities described herein while addressing the challenges described herein.

Multifunctional monomers may be used to form the resin particles of the high viscosity latex, i.e., those comprising more than one polymerizable group (e.g., 2, 3, 4). These are useful as they facilitate crosslinking within the resin particles. Illustrative multifunctional monomers include difunctional monomers such as a poly(ethylene glycol) di(meth)acrylate, e.g., poly(ethylene glycol) diacrylate having a molecular weight of 250 g/mol. Other poly(ethylene glycol) di(meth)acrylates may be used, including those having a molecular weight in a range of from 214 g/mol to 1000 g/mol, from 214 g/mol to 500 g/mol, and from 214 g/mol to 300 g/mol. These molecular weight values may be determined using gel permeation chromatography. It has been found that these types of difunctional monomers is particularly useful for achieving the viscosities described herein. These difunctional monomers may also be considered to be hydrophilic as noted above. Other hydrophilic difunctional monomers include a diacrylate compound bonded with an alkyl chain containing an ether bond, such as diethylene glycol diacrylate, triethylene glycol diacrylate, tetraethylene glycol diacrylate, polyethylene glycol #400 diacrylate, polyethylene glycol #600 diacrylate, dipropylene glycol diacrylate, and compounds obtained by substituting acrylate of these compounds with methacrylate; a diacrylate compound bonded with a chain containing an aromatic group and an ether bond, such as polyoxyethylene(2)-2,2-bis(4-hydroxyphenyl)propane diacrylate, polyoxyethylene(4)-2,2-bis(4-hydroxyphenyl)propane diacrylate, and compounds obtained by substituting acrylate of these compounds with methacrylate. Other difunctional monomers include a diene compound, such as isoprene and butadiene, an aromatic divinyl compound, such as divinylbenzene and divinylnaphthalene; a diacrylate compound bonded with an alkyl chain, such as ethylene glycol diacrylate, 1,3-butylene glycol diacrylate, 1,4-butanediol diacrylate, 1,5-pentanediol diacrylate, 1,6-hexanediol diacrylate, 1,10-dodecanediol diacrylate, neopentyl glycol diacrylate, and compounds obtained by substituting acrylate of these compounds with methacrylate. Multifunctional monomers include pentaerythritol triacrylate, trimethylolmethane triacrylate, trimethylolpropane triacrylate, tetramethylolmethane tetraacrylate, oligoester acrylate, and compounds obtained by substituting acrylate of these compounds with methacrylate.

Reactive surfactants may be used to form the resin particles of the high viscosity latex. Suitable reactive surfactants comprise a polymerizable (and thus, reactive) group such that they become incorporated into the resin particles. Illustrative reactive surfactants include anionic ether sulfate reactive surfactants such as those in the commercially available Hitenol BC series such as Hitenol BC10-25. Other suitable reactive surfactants include polyoxyethylene alkylphenyl ether ammonium sulfate, Hitenol BC-10, BC-20, BC-2020, BC-30; polyoxyethylene styrenated phenyl ether ammonium sulfate including Hitenol AR-10, AR-20, AR10-25, AR-2020; non-ionic polyoxyethylene alkylphenyl ether including Noigen RN-10, RN-20, RN-30, RN-40, RN-5065; and reactive surfactant available from Ethox including E-sperse RX-201, RX-202, RX-203, RS-1596, RS-1616, RS-1617, RS-1618, RS-1684.

A chain transfer agent may be used to form the high viscosity latex. The chain transfer agent may be a mercaptan or a thiol. Suitable chain transfer agents include n-dodecylmercaptan (NDM), n-dodecanethiol (DDT), tert-dodecylmercaptan, 1-butanethiol, 2-butanethiol, octanethiol, and combinations thereof. Halogenated carbons such as carbon tetrabromide, carbon tetrachloride, and combinations thereof may be used as chain transfer agents.

In forming the high viscosity latex, any of the monomers described above may be used in a monomer emulsion comprising a solvent. Water is generally used as the solvent, but water-soluble or water-miscible organic solvents (e.g., ethanol) may also be included. The type of monomers and their relative amounts may be selected to tune the properties of the resin particles/latex, including its viscosity and glass transition temperature $T_g$. However, it has been found that the following amounts are useful for achieving resin particles having viscosities and $T_g$ values within the ranges disclosed herein.

Acidic monomers may be used in the monomer emulsion in an amount in a range of from 1.5 weight % to 15 weight %. (Here, weight % refers to the (total weight of acidic monomers)/(total weight of monomers in the monomer emulsion, excluding the reactive surfactants)*100). This range includes from 5 weight % to 10 weight %. As noted above, two different types of acidic monomers having different $pK_a$ values may be used in the weight ratios described above. Hydrophilic monomers may be used in the monomer emulsion an amount in a range of from 1 weight % to 15 weight %. (Weight % has a meaning analogous to that described for acidic monomers.) This range includes from 2 weight % to 15% weight % and from 5 weight % to 15 weight %. Multifunctional monomers, including difunctional monomers, may be used in the monomer emulsion in similar amounts. However, it has been found that the stability of the aqueous inkjet ink composition is very sensitive to the amount of the multifunctional monomer. Thus, in embodiments, the amount is in a range of from 0.01 weight % to 0.8 weight %, from 0.03 weight % to 0.3 weight % or from 0.4 weight % to 0.6 weight %. Other monomers, (e.g., styrenes, alkyl (meth)acrylates) may be present in an amount in a range of from 70 weight % to 97 weight %. (Weight % has a meaning analogous to that described for acidic monomers.) This range includes from 75 weight % to 90 weight %.

Together, the amount of acidic monomers, hydrophilic monomers, and multifunctional monomers (e.g., hydrophilic multifunctional monomers) may be present in the monomer emulsion a range of from 10 weight % to 30 weight %. (Here, weight % refers to the (total weight of acidic monomers, hydrophilic monomers, and multifunctional monomers)/(total weight of monomers in the monomer emulsion, excluding the reactive surfactants)*100). This range includes from 15 weight % to 30 weight % and from 15 weight % to 25 weight %. These amounts are much higher than are conventionally be used since acidic monomers and hydrophilic multifunctional monomers present incorporation challenges similar to those described above for the disclosed hydrophilic monomers.

Reactive surfactants may be used in the monomer emulsion an amount in a range of from 1.5 weight % to 6.5 weight %. (Here, weight % refers to the (total weight of reactive surfactants)/(total weight of monomers in the monomer emulsion, including the reactive surfactant monomers)*100). This range includes from 1.5 weight % to 5 weight %.

The chain transfer agent(s) may be present in the monomer emulsion and may be used in various suitable amounts, for example, from 0.25 weight % to 2.5 weight %. (Here, weight % refers to the (total weight of chain transfer agents)/(total weight of monomers in the monomer emulsion, excluding the reactive surfactants)*100.)

In embodiments, the monomer emulsion comprises (or consists of) a solvent (e.g., water), a styrene, an alkyl acrylate (e.g., butyl acrylate), an acidic monomer, a hydrophilic monomer, a multifunctional (e.g., a difunctional monomer), a reactive surfactant, and a chain transfer agent. In such embodiments, one type or different types of the various monomers may be used. Similarly, one type or different types of the solvent and/or one type or different types of the chain transfer agent may be used. In embodiments, the monomer emulsion comprises (or consists of) a solvent (e.g., water), a styrene, an alkyl acrylate (e.g., butyl acrylate), two different types of acidic monomers (e.g., a methacrylic acid and a sulfonic acid), a hydrophilic monomer (e.g., a poly(ethylene glycol) methacrylate), a difunctional monomer (e.g., a poly(ethylene glycol) diacrylate), a reactive surfactant, and a chain transfer agent. In any of these embodiments, amounts of the various monomers and chain transfer agents may be used as described above. The balance may be made up of the solvent. It has been found that these particular combinations at the amounts described above are particularly useful for achieving resin particles having viscosities and $T_g$ values within the ranges disclosed herein.

At least in embodiments, the monomer emulsion is free of (i.e., does not comprise) a surfactant. Here, "surfactant" refers to non-reactive, non-polymerizable anionic surfactants such as sodium dodecylsulfate (SDS), sodium dodecylbenzene sulfonate, sodium dodecylnaphthalene sulfate; dialkyl benzenealkyl sulfates; palmitic acid; alkyldiphenyloxide disulfonate; and branched sodium dodecyl benzene sulfonate. "Surfactant" also refers to non-reactive, non-polymerizable cationic surfactants such as alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, trimethyl ammonium bromide, halide salts of quarternized polyoxyethylalkylamines, and dodecylbenzyl triethyl ammonium chlorides. "Surfactant" also refers to non-reactive, non-polymerizable nonionic surfactants such as polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, and block copolymer of polyethylene oxide and polypropylene oxide. Thus, the monomer emulsion may be free of (i.e., does not comprise) any of these surfactants.

Processing steps for forming the high viscosity latexes are described below. The present methods comprise adding any of the monomer emulsions described above to a reactive surfactant solution at a feed rate over a period of time. The reactive surfactant solution comprises a solvent and a reactive surfactant. Any of the solvents and any of the reactive surfactants described above may be used. One type or different types of solvent and/or reactive surfactants may be used. The reactive surfactant in the reactive surfactant solution may be the same type or a different type as compared to a reactive surfactant that may be present in the monomer emulsion. The reactive surfactant solution may further comprise a buffer. Various buffers may be used such as sodium bicarbonate, sodium carbonate, and ammonium hydroxide. The reactive surfactant may be used in an amount in a range of from 1 weight % to 10 weight %. (Here, weight % refers to the (total weight of reactive surfactants)/(total weight of reactive surfactant solution)*100.) This range includes from 2 weight % to 5 weight %. The buffer may be used in an amount in a range of from 0.25 weight % to 2.5 weight %. (Weight % has a meaning analogous to that described above.)

An initiator may be included in the reactive surfactant solution. Alternatively, a separate initiator solution comprising the initiator and any of the solvents described above may be formed and the separate initiator solution added to the reactive surfactant solution. The separate initiator solution may be added prior to the addition of the monomer emulsion. An additional amount of a separate initiator solution may be added after the addition of the monomer emulsion. One type or different types of solvent and/or initiators may be used. Examples of suitable initiators include water soluble initiators, such as ammonium persulfate (APS), sodium persulfate and potassium persulfate; and organic soluble initiators including organic peroxides and azo compounds including Vazo peroxides, such as VAZO 64™, 2-methyl 2-2'-azobis propanenitrile, VAZO 88™, 2-2'-azo-bis isobutyramide dehydrate; and combinations thereof. Other water-soluble initiators which may be used include azoamidine compounds, for example 2,2'-azobis(2-methyl-N-phenylpropionamidine) dihydrochloride, 2,2'-azobis[N-(4-chlorophenyl)-2-methylpropionamidine]di-hydrochloride, 2,2'-azobis[N-(4-hydroxyphenyl)-2-methylpropionamidine]dihydrochloride, 2,2'-azobis[N-(4-aminophenyl)-2-methylpropionamidine]tetrahydrochloride, 2,2'-azobis[2-methyl-N-(phenylmethyl)propionamidine]dihydrochloride, 2,2'-azobis[2-methyl-N-2-propenylpropionamidine]dihydrochloride, 2,2'-azobis[N-(2-hydroxy-ethyl)2-methylpropionamidine]dihydrochloride, 2,2'-azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochlo- ride, 2,2'-azobis[2-(5-hydroxy-3,4,5,6-tetrahydropyrimidin-2-yl)propane]di- hydrochloride, 2,2'-azobis {2-[1-(2-hydroxyethyl)-2-imidazolin-2-yl]propane}dihydrochloride, and combinations thereof. The initiator may be used in an amount in a range of from 0.1 weight % to 2.5 weight %. (Here, weight % refers to the (total weight of initiators)/(total weight of reactive surfactant solution)*100.)

Silica nanoparticles may be included in the reactive surfactant solution. These are particularly useful for achieving the disclosed viscosities as they may become bound to hydrogen bonding moieties of the hydrophilic monomers and/or water molecules bound to the hydrogen bonding moieties. Although some existing latexes for aqueous inkjet ink compositions may include silica nanoparticles, they have generally not been included during the polymerization process as described herein. The size of the silica nanoparticles used are generally quite small, e.g., silica nanoparticles having an average diameter of no greater than 100 nm, no greater than 50 nm, or in a range of from 5 nm to 50 nm. Silica nanoparticles may be included in the reactive surfactant solution at an amount in a range of from 0.5 weight % to 5 weight %. (Here, weight % refers to the total weight of silica nanoparticles)/(total weight of reactive surfactant solution)*100. The total weight of silica nanoparticles refers to solid weight, rather than the weight of a silica nanoparticle solution). Commercially available silica nanoparticles which may be used include the following: various grades of LUDOX Colloidal Silica such as FM, SM, HS-30, HS-40, LS, TM-40, TM-50, SM-AS, AS-30, AS-40, AM, HSA, TMA, P X-30, P t-40, P W-50, CL, and CL-P; and various grades of Nissan Chemical Silica such as SNOWTEX ST-20L, ST-30, ST-40, ST-50, ST-OS, ST-O, ST-O-40, ST-OL, ST-C, ST-C-30, ST-CM, ST-N, STN30G, ST-N40, ST-NS, ST-XS, ST-S, ST-UP, ST-O-UP, MA-ST-UP, ST-PS-S, AMT-3305, HX-305M1, and HX-305M5.

In embodiments, the reactive surfactant solution comprises (or consists of) a solvent (e.g., water), a reactive surfactant, and optionally, one or more of an initiator, a buffer, and silica nanoparticles. In such embodiments, one type or different types of these components may be used. In any of these embodiments, amounts of the reactive surfactants, initiator, buffer, and silica nanoparticles may be used as described above. The balance may be made up of the solvent. At least in some embodiments, the reactive surfactant solution is free of (i.e., does not comprise) any of the surfactants described above. In at least some embodiments, the reactive surfactant solution is free of (i.e., does not comprise) any monomers, other than the reactive surfactant monomer(s) present in the solution.

The addition of the monomer emulsion to the reactive surfactant solution may be carried out under an inert gas (e.g., nitrogen) and at an elevated temperature (e.g., greater than room temperature such as a temperature in a range of from 50° C. to 90° C.). This may be accomplished by purging with the inert gas and heating the reactive surfactant solution prior to the addition of the monomer emulsion and continuing during the addition of the monomer emulsion.

As noted above, the monomer emulsion is added at a feed rate over a period of time. In the presence of the initiator, the monomers of the monomer emulsion undergo polymerization reactions to form the resin particles of the high viscosity latex. The feed rate is sufficiently slow so that the polymerization is carried out under "monomer-starved" conditions. This means that the feed rate is no greater than the rate the polymerization reactions, e.g., between styrene and acrylate monomers. Illustrative feed rates include those in a range of from 1 mL/min to 10 mL/min based on a total reaction volume of 1 L. Illustrative periods of time include those in a range of from 60 minutes to 600 minutes. After the monomer emulsion has been added, the polymerization may be allowed to continue for an additional period of time, with or without the addition of additional initiator. Illustrative additional periods of time include those in a range of from 1 hour to 18 hours. Both the addition of the monomer emulsion and the polymerization after addition may be carried out under the inert gas and at the elevated temperature. Optionally, the latex formed may be processed by standard techniques such as coagulation, dissolution and precipitation, filtering, washing, or drying. If solvent/water is removed from the latex, e.g., via drying, the dried latex still comprises the resin particles, which may be used to form the aqueous inkjet ink composition described below. Thus, any of the disclosed aqueous inkjet ink compositions may simply comprise the resin particles of any of the disclosed latexes.

It is noted that, at least in embodiments, the present methods do not involve the use of a resin seed in forming the resin particles of the high viscosity latex. This is by contrary to existing processes which make use of resin seeds in order to initiate and stabilize polymerization. Thus, in such embodiments, neither the monomer emulsion nor the reactive surfactant solution comprises such a resin seed. The polymerization reactions that form the resin particles also do not involve such a resin seed. Similarly, at least in embodiments, the present methods do not involve the use of any of the surfactants (other than the reactive surfactant monomers) described above.

The present methods may further comprise forming the monomer emulsion, forming the reactive surfactant solution, and/or forming the initiator solution. Each may be formed by combining the desired components at the desired amounts and mixing.

The composition of the resin particles formed using the present methods depends upon the selection of the monomers and their relative amounts and the polymerization reactions between selected monomers that produce a polymerization product as described above. Thus, a variety of compositions are encompassed based on the description above, including those based on various polymerization products of reactants comprising various combinations of monomers. However, in embodiments, the resin particles comprise (or consist of) the polymerization product (e.g., a copolymer) of reactants comprising a styrene, an alkyl acrylate (e.g., butyl acrylate), an acidic monomer, a hydrophilic monomer, a multifunctional monomer (e.g., a difunctional monomer), and a reactive surfactant. In such embodiments, one type or different types of the various monomers may be present. In embodiments, the resin particles comprise (or consist of) the polymerization product of reactants comprising a styrene, an alkyl acrylate (e.g., butyl acrylate), two different types of acidic monomers (e.g., a methacrylic acid and a sulfonic acid), a hydrophilic monomer (e.g., a poly(ethylene glycol) methacrylate), a difunctional monomer (e.g., a poly(ethylene glycol) diacrylate), and a reactive surfactant. In each of these embodiments, an initiator may be incorporated at the beginning and end of each polymer chain in the resin particles. In each of these embodiments, the resin may be crosslinked due to the multifunctional/difunctional monomer. In each of these embodiments, the monomers may be present in the resin particles in the amounts described above. For example, together, the amount of the acidic monomer, the hydrophilic monomer, and the multifunctional monomer, may be in a range of from 10 weight % to 30 weight % in the resin particles. As above, this weight % refers to the (total weight of acidic monomers, hydrophilic monomers, and multifunctional monomers)/(total weight of monomers in the resin particles, excluding the reactive surfactants)*100. As noted above, it has been found that these particular combinations at the amounts described above are particularly useful for achieving resin particles having viscosities and $T_g$ values within the ranges disclosed herein.

As described above, the latexes formed by the present methods may be characterized by their viscosities. The viscosity values may refer to a particular temperature and a particular solids content and may be measured using a Tuning fork vibration viscometer (Cole-Parmer) or an ARES-G2 rheometer (TA instruments) as described in the Examples, below. In embodiments, the viscosity at room temperature and a solids content of 30% is in a range of from 10 cP to 100 cP. (As used throughout the present disclosure, a solids content of 30% encompasses a solids content within ±5% of this value.) This includes from 10 cP to 80 cP, from 10 cP to 40 cP, and from 15 cP to 40 cP. These viscosities are all initial viscosities, measured relatively shortly after formation of the latexes. (See Table 2, below.)

The latexes formed by the present methods may also be characterized by the $T_g$ values of the resin particles therein. The $T_g$ values may be measured using a Differential Scanning calorimetry (DSC) TA Instruments Discovery DSC 2500 as described in the Examples, below. In embodiments, the $T_g$ is in a range of from 35° C. to 100° C. This includes a range of from 35° C. to 80° C., and from 50° C. to 80° C. These values reflect the mechanical robustness of the resin particles and printed ink. Nevertheless, as demonstrated in the Examples, below, the aqueous inkjet ink compositions exhibit surprisingly excellent film formation capabilities. It is believed this is due, at least in part, to the incorporation of the disclosed hydrophilic monomers in the resin particles as described above.

The present methods are also able to achieve resin particles having a small size and narrow size distribution. This contributes to greatly improved stability and printing performance of aqueous inkjet ink compositions comprising the resin particles. The size of the resin particles may be reported as a $D_{(z, ave)}$ value, measured using a nanoparticle analyzer such as a Malvern Nano-Zetasizer. In embodiments, the $D_{(z, ave)}$ is no greater than 150 nm, no greater than 140 nm, no greater than 130 nm, no greater than 100 nm, or in a range of from 80 nm to 150 nm. The size distribution may be reported as a polydispersity index (PDI), measured using a nanoparticle analyzer such as a Malvern Nano-ZS. In embodiments, the PDI is no greater than 0.1, no greater than 0.050, no greater than 0.040, no greater than 0.035, no greater than 0.030 or in a range of from 0.001 to 0.1.

Due to their small size and narrow size distribution, the resin particles of the present high viscosity latexes may further be characterized as being free of (i.e., not comprising) large particles. This may be evidenced by a $D_{(v, 90)}$ value of less than 200 nm, less than 175 nm, or less than 150 nm.

The small size and narrow size distribution of the present high viscosity latexes may be further evidenced by the ability to form of three-dimensional (3D) photonic crystals upon removal of solvent (i.e., drying) from the latex. Such crystal formation is possible because of the uniform size distribution of the resin particles. Local crystallization and the ability to form the 3D photonic crystals may be confirmed using scanning tunneling electron microscopy (STEM). (See FIG. 2.) Controlled heating may be used to achieve the 3D photonic crystals.

Aqueous Inkjet Ink Compositions

Any of the high viscosity latexes described above may be used to provide an aqueous inkjet ink composition without needing to add any water-soluble resins to further adjust viscosity. Despite the high $T_g$ values of the high viscosity latexes, the aqueous inkjet ink compositions still readily form films. The mechanically robust resin particles then contribute to the excellent rub/mar-resistance and waterfastness. The latex may be present in the aqueous inkjet ink composition in an amount in a range of from 1 weight % to 10 weight %. (Here, weight % refers to the (total weight of dry latex)/(total weight of aqueous inkjet ink composition) *100.) This range includes from 5 weight % to 10 weight %. A variety of other components may be used to form the aqueous inkjet ink compositions as described below.

Solvent System

The aqueous inkjet ink compositions comprise a solvent system based on water. The solvent system can consist solely of water, or can comprise a mixture of water and a water-soluble and/or water-miscible organic solvent. The water-soluble and water-miscible organic solvents may be referred to herein as a co-solvent or a humectant. Suitable such organic solvents include alcohols and alcohol derivatives, including aliphatic alcohols, aromatic alcohols, diols, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, and ethoxylated glycerol. Illustrative examples include ethylene glycol, propylene glycol, diethylene glycols, glycerine, dipropylene glycols, trimethylolpropane, 1,2-hexanediol, 1,5-pentanediol, 2-methyl-1,3-propanediol, 2-ethyl-2-hydroxymethyl-1,3-propanediol, 3-methoxybutanol, 3-methyl-1,5-pentanediol, 1,3-propanediol, 1,4-butanediol, and 2,4-heptanediol. Other suitable solvents include amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxyproponic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, and substituted and unsubstituted acetamides. Combinations of these organic solvents may be used.

Suitable water-soluble and/or water-miscible organic solvents include a glycol of hydrocarbons having a carbon number of 4 to 7. Examples of such a glycol include 1,2-pentane diol; 1,2-hexanediol; 1,5-pentanediol; 1,6-hexanediol; 3-methyl-1,3-butanediol; 1,2-butanediol; 2,4-pentanedi ol; 1,7-heptanediol; 3-methyl-1,5-pentanediol; trimethylolpropane; ethyleneurea; 1,2,6-hexantriol; 1,2,3-butanetriol; sorbitol; urea; diethylene glycol; 1,2,4-butanetriol; glycerol; diglycerol; triethylene glycol; polyethylene glycol 200; and polyethylene glycol 600.

In embodiments, the solvent system comprises water, a 1,2-alcohol (e.g., 1,2-hexanediol), a glycol (e.g., propylene glycol), and a glycerol.

In solvent systems comprising water and an organic solvent, the water to organic solvent weight ratio, as well as the type and relative amount of different organic solvents, may be selected to achieve certain properties for the aqueous inkjet ink composition such as a desired surface tension, viscosity, etc. In embodiments, the water to organic solvent weight ratio is from 90:10 to 51:49. If more than one organic solvent is used, these weight ratios refer to the total amount of organic solvent. As water may be present in the latex, colorant, etc., these weight ratios refer to the total amount of water.

Similarly, various total amounts of the solvent system may be used in the aqueous inkjet ink compositions. In embodiments, the solvent system is present in an amount of from 50 weight % to 95 weight %, from 60 weight % to 90 weight %, or from 65 weight % to 90 weight %. (Here, weight % refers to the (total weight of solvent system)/(total weight of aqueous inkjet ink composition)*100.) In embodiments, the total amount of water present is at least 50 weight %, at least 60 weight %, at least 80 weight %, or in a range of from 50 weight % to 95 weight %. (Here, weight % refers to the (total weight of water)/(total weight of aqueous inkjet ink composition)*100.)

Colorant

The aqueous inkjet ink composition may comprise a colorant. Colorants include pigments, dyes, and combinations thereof. Examples of suitable dyes include anionic dyes, cationic dyes, nonionic dyes, and zwitterionic dyes. Specific examples of suitable dyes include Food dyes such as Food Black No. 1, Food Black No. 2, Food Red No. 40, Food Blue No. 1, Food Yellow No. 7, FD & C dyes, Acid Black dyes (No. 1, 7, 9, 24, 26, 48, 52, 58, 60, 61, 63, 92, 107, 109, 118, 119, 131, 140, 155, 156, 172, 194), Acid Red dyes (No. 1, 8, 32, 35, 37, 52, 57, 92, 115, 119, 154, 249, 254, 256), Acid Blue dyes (No. 1, 7, 9, 25, 40, 45, 62, 78, 80, 92, 102, 104, 113, 117, 127, 158, 175, 183, 193, 209), Acid Yellow dyes (No. 3, 7, 17, 19, 23, 25, 29, 38, 42, 49, 59, 61, 72, 73, 114, 128, 151), Direct Black dyes (No. 4, 14, 17, 22, 27, 38, 51, 112, 117, 154, 168), Direct Blue dyes (No. 1, 6, 8, 14, 15, 25, 71, 76, 78, 80, 86, 90, 106, 108, 123, 163, 165, 199, 226), Direct Red dyes (No. 1, 2, 16, 23, 24, 28, 39, 62, 72, 236), Direct Yellow dyes (No. 4, 11, 12, 27, 28, 33, 34, 39, 50, 58, 86, 100, 106, 107, 118, 127, 132, 142, 157), Reactive Dyes, such as Reactive Red Dyes (No. 4, 31, 56, 180), Reactive Black dyes (No. 31), Reactive Yellow dyes (No. 37); anthraquinone dyes, monoazo dyes, disazo dyes, phthalocyanine derivatives, including various phthalocyanine sulfonate salts, aza(18)annulenes, formazan copper complexes, and triphenodioxazines.

Examples of suitable pigments include black pigments, cyan pigments, magenta pigments, and yellow pigments. Pigments can be organic or inorganic particles. Suitable inorganic pigments include carbon black. However, other inorganic pigments may be suitable such as cobalt blue (CoO—$Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, and anthanthrone pigments such as PR168. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH® 1400, MONARCH® 1300, MONARCH® 1100, MONARCH® 1000, MONARCH® 900, MONARCH® 880, MONARCH® 800, MONARCH® 700, CAB-O-JET® 200, CAB-O-JET® 300, CAB-O-JET® 450, REGAL®, BLACK PEARLS®, ELFTEX®, MOGUL®, and VULCAN® pigments; Columbian pigments such as RAVEN® 5000, and RAVEN® 3500; Evonik pigments such as Color Black FW 200, FW 2, FW 2V, FW 1, FW18, FW 5160, FW 5170, Special Black 6, Special Black 5, Special Black 4A, Special Black 4, PRINTEX® U, PRINTEX® 140U, PRINTEX® V, and PRINTEX® 140V. Other pigments include CAB-O-JET 352K, CAB-O-JET 250C, CAB-O-JET 260M, CAB-O-JET 270Y, CAB-O-JET 465M, CAB-O-JET 470Y and CAB-O-JET 480V (available from Cabot Corporation).

The above list of pigments includes unmodified pigment particulates, small molecule attached pigment particulates, and polymer-dispersed pigment particulates.

In forming the aqueous inkjet ink compositions, the colorant(s) may be provided as a colorant dispersion comprising the colorant and a solvent (e.g., water). The colorant may be in the form of a particle and have an average particle size of from 20 nm to 500 nm, from 20 nm to 400 nm, or from 30 nm to 300 nm.

Various amounts of colorant may be used in the aqueous inkjet ink compositions. Generally, however, an amount is selected such that the total solids content (generally provided by the latex, the colorant, and if present, a wax) of the aqueous inkjet ink composition is from 5 weight % to 15 weight %, from 6 weight % to 12 weight %, or from 7 weight % to 10 weight %. (Here, weight % refers to the (total weight of solids)/(total weight of aqueous inkjet ink composition) *100.)

Wax

The aqueous inkjet ink composition may comprise a wax. The type and amount may be selected to optimize the rub resistance and water fastness of the aqueous inkjet ink composition. Illustrative waxes include paraffin waxes, polyethylene waxes, polypropylene waxes, microcrystalline waxes, polyolefin waxes, montan based ester waxes and carnauba waxes. Waxes having a melting point in a range of from 50° C. to 150° C. may be used. Nanoscale (e.g., diameter of 1000 nm or less, 500 nm or less, or 100 nm or less) wax emulsions based on carnauba wax and paraffin wax may be used, including those from Michelman (e.g., Michem Lube 103DI, 124, 124P135,156, 180, 182, 190, 270R, 368, 511, 693, 723, 743, 743P, and 985; and Michem Emulsion 24414, 34935, 36840, 41740, 43040, 43240, 44730, 47950, 48040M2, 61355, 62330, 66035, 67235, 70750, 71150, 71152, 91735, 93235, 93335, 93935, and 94340). Waxes from Byk may also be used, including Aquacer 2500, Aquacer 507, Aquacer 513, Aquacer 530, Aquacer 531, Aquacer532, Aquacer 535, Aquacer 537, Aquacer 539, and Aquacer 593.

It has been found that nanoscale wax emulsions based on charged waxes (e.g., anionic waxes) are particularly useful for achieving desired dry and wet rub resistance (see Example 6). An illustrative such wax is Michem Lube 190.

Various amounts of wax may be used in the aqueous inkjet ink compositions. Generally, however, an amount is selected such that the total solids content of the aqueous inkjet ink composition is from 5 weight % to 15 weight %, from 6 weight % to 12 weight %, or from 7 weight % to 10 weight %. (Here, weight % refers to the (total weight of solids)/(total weight of aqueous inkjet ink composition)*100.)

Surfactant

Unlike the high viscosity latex described above, the aqueous inkjet ink compositions may comprise one or more surfactants. Examples of suitable surfactants include anionic surfactants (such as sodium lauryl sulfate (SLS), Dextrol OC-40, Strodex PK 90, ammonium lauryl sulfate, potassium lauryl sulfate, sodium myreth sulfate and sodium dioctyl sulfosuccinate series), nonionic surfactants (Surfynol® 104 series, Surfynol® 400 series, Dynol™604, Dynol™607, Dynol™810, EnviroGem® 360, secondary alcohol ethoxylate series such as Tergitol™15-s-7, Tergitol™15-s-9, TMN-6, TMN-100x and Tergitol™ NP-9, Triton™ X-100, etc.) and cationic surfactants (Chemguard S-106A, Chemguard S-208M, Chemguard S-216M). Some fluorinated or silicone surfactants can be used such as PolyFox™ TMPF-136A, 156A, 151N, Chemguard S-'761p, S-'764p, Silsurf® A008, Siltec® C-408, BYK 345, 346, 347, 348 and 349, polyether siloxane copolymer TEGO® Wet-260, 270 500, etc. Some amphoteric fluorinated surfactants can also be used such as alkyl betaine fluorosurfactant or alkyl amine oxide fluorosurfactant such as Chemguard S-500 and Chemguard S-111.

Various amounts of surfactant may be used in the aqueous inkjet ink compositions. In embodiments, the surfactant is present in an amount in a range of from 0.01 weight % to 2 weight %. (Here, weight % refers to the (total weight of surfactant)/(total weight of aqueous inkjet ink composition) *100.) If more than one type of surfactant is used, these amounts refer to the total amount of surfactant.

Additives

Various additives may be used in the aqueous inkjet ink compositions to tune the properties thereof. Suitable additives include one or more of biocides; fungicides; stabilizers; pH controlling agents such as acids or bases, phosphate salts, carboxylates salts, sulfite salts, amine salts, buffer solutions; sequestering agents such as EDTA (ethylenediamine tetra acetic acid); defoamers; and wetting agents.

Various amounts of the additives may be used in the aqueous inkjet ink compositions. In embodiments, the additives are present in an amount in a range of from 0.01 weight % to 5 weight %. (Here, weight % refers to the (total weight of additives)/(total weight of aqueous inkjet ink composition)*100.) If more than one type of additive is used, these amounts refer to the total amount of additives.

In at least embodiments, the present aqueous inkjet ink compositions are free of (i.e., do not comprise) a coagulant and are free of (i.e., do not comprise) a coalescing agent and are free of (i.e., do not comprise) a plasticizer. In embodiments, the ink compositions are free of (i.e., do not comprise) any pyrrolidone-based solvents such as N-methylpyrrolidone, and are free of (i.e., do not comprise) Texanol and Texanol isobutyrate.

As noted above, the present aqueous inkjet ink compositions are free of (i.e., do not comprise) a water-soluble resin. This means being free of (i.e., not comprising) water-soluble resins such as polyethylene glycol and polyvinylpyrrolidone. The aqueous inkjet ink compositions may also be free of (i.e., do not comprise) binder resins such as acrylic polymers such as styrene-acrylic copolymers and vinylpyrrolidone copolymers, urethane or polyurethane dispersions, and acrylic-urethane hybrid dispersions. More specific binder resins which may be excluded include those available from Johnson Polymers (BASF) such as Joncryl 661, Joncryl 8003, Joncryl 8078, Joncryl 8082, Joncryl 537, Joncryl H538, Joncryl H538, Joncryl including the name of HPD 71E. Other exemplary water-soluble resins which are excluded are Rhoplex 1-1955, Rhoplex I-2426D, Rhoplex 1-62, Rhoplex 1-98, Rhoplex E-1691, available from Rhohm & Haas. Others excluded are Lucidene 190, Lucidene 400, and Lucidene 243, available from DSM Corporation; NeoCryl A-1110, NeoCryl A-2092, NeoCryl A-639, NeoRad R-440, NeoRad R-441, NeoRez N-55 under the name 972, PVP K-15, PVP K-30, PVP K-60, PVP K-85, Ganex P-904LC, PVP/VA W-63 available from ISP.

Similarly, the present aqueous inkjet ink compositions may be free of (i.e., do not comprise) a resin other than those provided by the present high viscosity latexes. A single type of high viscosity latex may be used.

In embodiments, the aqueous inkjet ink composition comprises (or consists of) a solvent system; a high viscosity latex; a colorant; and optionally, one or more of a wax and an additive. In embodiments, the aqueous inkjet ink composition comprises (or consists of) a solvent system; a high viscosity latex; a colorant; a wax; and optionally, an additive. In any of these embodiments, the additives may be selected from a stabilizer, a surfactant, a defoamer, a wetting agent, and a biocide. In any of these embodiments, the components may be selected from any of the solvent systems, high viscosity latexes, colorants, waxes, and additives disclosed herein. In any of these embodiments, amounts of the components may be used as described above. In any of these embodiments, a single type of high viscosity latex may be used. In any of the embodiments in this paragraph, the phrase "high viscosity latex" may be replaced with "resin particles."

The aqueous inkjet ink compositions may be formed by combining the desired components at the desired amounts and mixing. An illustrative method comprises adding any of the disclosed high viscosity latexes (or the resin particles) to a colorant dispersion to form a first mixture; and adding a second mixture comprising a solvent system and an additive (s) to the first mixture to form the aqueous inkjet ink composition. A third mixture comprising a wax may be added to the combined first and second mixtures. Mixing and/or heating may be used during the method. The aqueous inkjet ink composition may be filtered prior to use. Illustrative details are provided in the Examples, below.

The aqueous inkjet ink compositions may be used to form printed images. In embodiments, such a method comprises ejecting droplets of any of the disclosed aqueous inkjet ink compositions onto a substrate to form an image thereon. Such a method may further comprise incorporating the ink composition into an inkjet printing apparatus. The printing apparatus may employ a thermal inkjet process wherein the ink composition in the nozzles is selectively heated in an imagewise pattern, thereby causing droplets of the ink composition to be ejected in imagewise pattern. Alternatively, the printing apparatus may employ an acoustic inkjet process wherein droplets of the ink composition are caused to be ejected in imagewise pattern by acoustic beams. In yet another embodiment, the printing apparatus may employ a piezoelectric inkjet process, wherein droplets of the ink composition are caused to be ejected in imagewise pattern by oscillations of piezoelectric vibrating elements. Any suitable substrate can be employed.

The method may comprise ejecting ink droplets in an imagewise pattern onto an intermediate transfer member, heating the image to partially or completely remove solvents, and transferring the ink composition in the imagewise pattern from the intermediate transfer member to a final recording substrate. The intermediate transfer member may be heated to a temperature above that of the final recording sheet and below that of the ink composition in the printing apparatus. An offset or indirect printing process is also disclosed in, for example, U.S. Pat. No. 5,389,958, the disclosure of which is totally incorporated herein by reference.

Any suitable substrate or recording sheet can be employed as the final recording sheet. Illustrative substrates include McCoy® Gloss #100 coated substrate, Xerox® Bold uncoated substrate, Kodak photo paper, Sterling® Ultra Web Matte (offset coated), TrueJet® Gloss Text (Inkjet treated coated), and McCoy® Silk (offset coated).

EXAMPLES

The following Examples are being submitted to further define various species of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

Example 1

A reactive surfactant solution of 1.5 grams (Hitenol BC 1025 from Montello), 36 grams deionized water, 0.3 g sodium bicarbonate, and 0.7 g of a silica nanoparticle solution (Ludox at 34%) was prepared by mixing in a glass reactor. The reaction was then purged with nitrogen for 30 minutes. The reactor was then continuously purged with nitrogen while being stirred at 250 rpm. The reactor was then heated up to 75° C. and held there. Separately, 0.4 grams of ammonium persulfate (APS) initiator was dissolved in 5 grams of deionized water and added to the reactor.

Separately, a monomer emulsion was prepared in the following manner: 28 g of styrene, 6 g of butyl acrylate, 3 g of methacrylic acid, 1 g of sodium 4-styrenesulfonate (styrenesulfonic acid), 1 g of hydroxyethyl acrylate (HEA), 0.6 g of 1-dodecanethiol (DDT), 0.2 g of PEGDA 250, 0.8 g of Hitenol BC 1025, and 16 g of deionized water were mixed to form an emulsion. The emulsified mixture was fed to the reactor slowly for 2 h and the reaction continued for 1.5 h. An additional 0.1 g of APS initiator was dissolved in deionized water and added to the reactor over 10 minutes and the reaction continued for an additional 1.5 hours. The resulting latex was cooled to room temperature and neutralized to pH 8.0 with 0.5 M KOH solution.

The latex formulation is shown in Table 1 and the properties of the latex are shown in Table 2. A Malvern Nano-ZS was used to analyze the dimensions of the resin particles of the latex. The distribution of sizes of the resin particles is shown in FIG. 1. The peak at 80 nm has a width of 21 nm and includes 100% by volume of the resin particles. Other parameters were as follows: $D_{(z, ave)}$=89 nm, $D_{(v, 10)}$=55, $D_{(v, 50)}$=76, and $D_{(v, 90)}$=112, and PDI=0.031. The conversion of the monomers was measured and shown to be above 99.9% conversion. Thus, the weight of monomers in the monomer emulsion are same as in the resin particles, excluding the polymerizable surfactant from the calculation.

Figure 2:
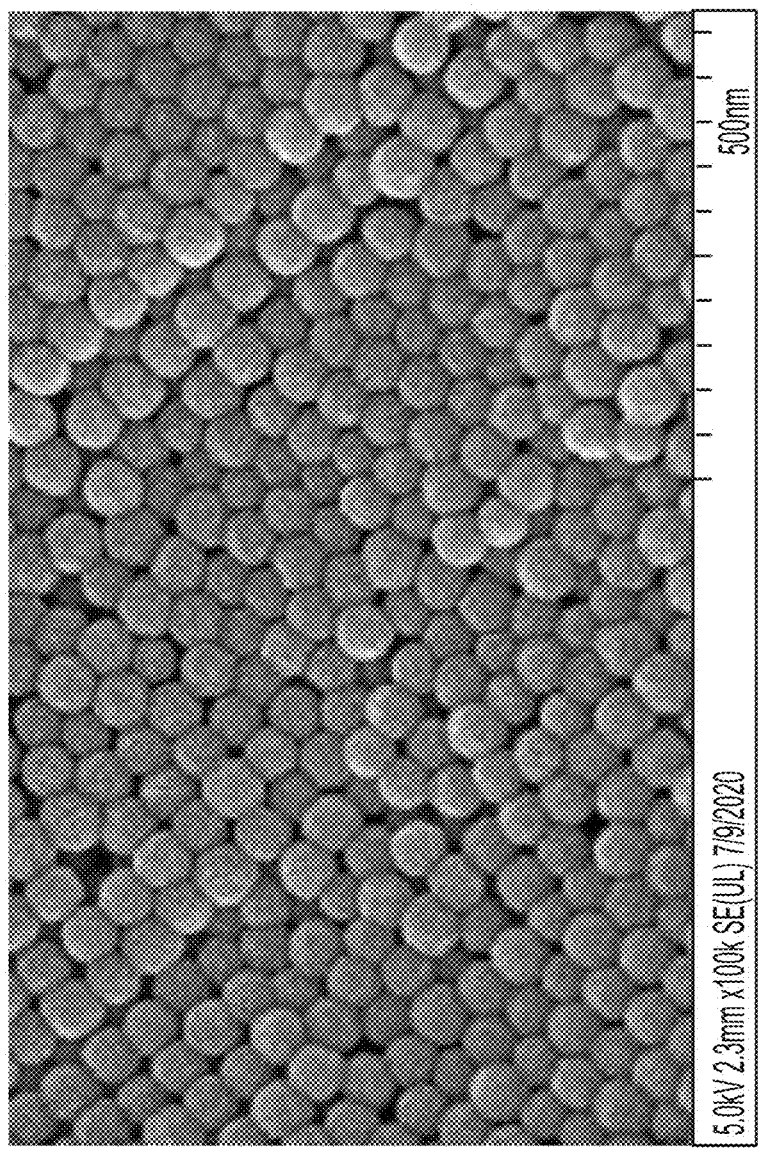
FIG. 2 shows a scanning transmission electron microscope (STEM) image of a dried high viscosity latex formed according to an illustrative embodiment of the present methods. This image shows local crystallization and demonstrates the ability to form three-dimensional (3D) photonic crystals.

As shown in FIG. 2, STEM images of the dried latex show local crystallization, demonstrating the ability to form three-dimensional (3D) photonic crystals. Table 2 also includes the measured viscosity and $T_g$ of the latex. A tuning fork vibration viscometer (Cole-Parmer) or an ARES-G2 rheometer (TA instruments) was used to measure the viscosity at room temperature and from 40 to 400 s$^{-1}$ $T_g$ was measured using a TA Instruments Discovery DSC 2500 at 3 continuous cycles of heating-cooling-heating with 10° C./min rate. Regarding $T_g$ values, the values are associated with the resin particles of the latexes.

Examples 2-4

In Examples 2-3, the procedure of Example 1 was repeated but hydroxyethyl acrylate was replaced with various amounts of either PEGMA 500 (having 9 ethylene glycol repeating units) or PEGMA 950 (having 19 ethylene glycol repeating units). In addition, no silica nanoparticles were used in Examples 2 and 3. The latex formulations are shown in Table 1 and the properties of the latexes are shown in Table 2.

Example 5 (Comparative)

In Example 5, the procedure of Example 1 was repeated but no hydrophilic monomer or silica nanoparticles were used. The latex formulation is shown in Table 1 and the properties of the latex are shown in Table 2.

TABLE 1

Latex Formulations.

| Material (g) | Example 1 | Example 2 | Example 3 | Example 4 | Example 5 |
|---|---|---|---|---|---|
| Styrene | 28 | 24 | 23.5 | 24 | 31 |
| Butyl Acrylate | 6 | 6 | 6 | 7 | 5 |
| Methacrylic Acid | 3 | 4 | 4 | 3 | 3 |
| Hitenol BC 1025 | 2.3 | 2.4 | 2.4 | 2.1 | 2.2 |
| DDT | 0.6 | 0.6 | 0.6 | 0.6 | 0.6 |
| PEGDA 250 | 0.2 | 0.15 | 0.15 | 0.2 | 0.12 |
| PEGMA 500 | 0 | 5 | 0 | 0 | 0 |
| PEGMA 950 | 0 | 0 | 5 | 3 | 0 |
| HEA | 1 | 0 | 0 | 0 | 0 |
| 4-styrenesulfonate | 1 | 0.5 | 1 | 1 | 0.5 |
| Silica Nanoparticles | 0.7 | 0 | 0 | 0.8 | 0 |
| APS | 0.4 | 0.3 | 0.3 | 0.4 | 0.3 |
| Sodium bicarbonate | 0.3 | 0.4 | 0.4 | 0.3 | 0.4 |
| Deionized water | 56.5 | 56.65 | 57.65 | 57.6 | 56.88 |
| Total | 100 | 100 | 100 | 100 | 100 |

TABLE 2

Latex Properties.

| | Z-ave (nm) | Zeta Potential (mV) | $T_g$ (° C.) | Viscosity (cp) (at solids content) |
|---|---|---|---|---|
| Example 1 | 89 | −67 | 76 | 11.8 (at 29.5%) |
| Example 2 | 140 | Not measured | 60 | 12.9 (at 28%) |
| Example 3 | 125 | −58 | 51.5 | 36.1 (at 24.5%) |
| Example 4 | 127 | −56 | 54 | 16.3 (at 29%) |
| Example 5 | 94 | −67 | 80 | 4.2 (at 28.5%) |

The results shown in Table 2 show striking differences in the viscosities of the latexes synthesized with hydrophilic monomers (Examples 1-4) and silica nanoparticles (Examples 1 and 4) as compared to comparative Example 5 (rigid latex with only acid functionality). The results for Examples 1-4 further demonstrate that viscosity may be controlled over a wide range. They also show that the greater the amount of hydrogen-bonding moieties in the latex, the greater the viscosity. Stability measurements (not shown) were also conducted for Example 1. The room temperature viscosity of the latex measured after about 40 days (e.g., ±12 hours) was the same as the room temperature viscosity measured on day 1 (i.e., the initial viscosity shown in Table 2), indicating excellent incorporation of the hydrophilic monomers and no leaching. Similarly, the room temperature viscosity of the latex measured after about 3 days (e.g., ±12 hours) in an about 60° C. oven (e.g., ±5° C.) was the same as the room temperature viscosity on day 1, again indicating excellent stability. By "same," it is meant within ±1%.

The results shown in Table 2 also show that the latexes synthesized with hydrophilic monomers (Examples 1-4) and silica nanoparticles (Examples 1 and 4) have relatively high $T_g$ values in their native states (not neutralized). (At basic pH, e.g., 8-9, as used in inkjet ink compositions, the latexes will have even higher $T_g$ values, due to the presence of counter ions (i.e. potassium).) The high $T_g$ values means that the resin particles are mechanically robust, helping protect images formed from the aqueous inkjet ink compositions from weathering and mar. The dry and wet rub resistance of films formed from aqueous inkjet ink compositions comprising the latexes is further described in Example 6, below.

Example 6

Aqueous inkjet ink compositions were formed using the latexes of Examples 1, 4, and Comparative Example 5. The following steps were used to form the aqueous inkjet ink compositions and the formulations are shown in Table 3:

1. The pigment dispersion was added to deionized water and mixed for about 15 minutes at a speed of about 300 RPM, using a pitched blade propeller.

2. The latex was added slowly to the pigment dispersion followed by defoamer and mixed for about 20 minutes (Mixture A).

3. In a separate beaker, the co-solvents, humectant, stabilizer, surfactant, and wetting agent were mixed to form a homogenous mixture (Mixture B).

4. Mixture B was slowly added into Mixture A. Once the addition was complete, the components were allowed to mix for another 20 minutes.

5. The wax was added and mixing continued for about another 15 minutes.

6. After mixing, the aqueous inkjet ink composition was left at room temperature for about 60 minutes before checking pH, conductivity and surface tension.

TABLE 3

Aqueous Inkjet Ink Compositions

| Component | Chemical | Latex of Example 1 | Latex of Example 4 | Latex of Comparative Example 5 |
|---|---|---|---|---|
| Solvent | Water | 18 | 21.7 | 10.13 |
| Colorant | CAB-O-JET ® C 450 (15% solids) | 28 | 19 | 28 |
| Latex | Latex | 13.8 | 18.5 | 5.27 |
| Water-Soluble Resin | PEG 4000 (15% solids) | 0 | 0 | 14.8 |
| Co-solvent 1 | 1,2-hexanediol | 7 | 7 | 7 |
| Co-solvent 2 | Propylene glycol | 28.5 | 28.5 | 28.5 |
| Humectant | Glycerol | 2 | 2 | 2 |
| Stabilizer | Triethanolamine | 0.2 | 0.4 | 0.4 |
| Defoamer | BYK024 | 0.25 | 0.25 | 0.2 |

TABLE 3-continued

Aqueous Inkjet Ink Compositions

| Component | Chemical | Latex of Example 1 | Latex of Example 4 | Latex of Comparative Example 5 |
|---|---|---|---|---|
| Surfactant | Silicone (Byk 349) | 0.5 | 0.5 | 0.5 |
| Wetting Agent | Multifunctional nonionic surfactant Surfynol AD01 | 0.25 | 0.15 | 0.2 |
| Wax | Michem Lube 190 (35% solids) | 1.5 | 2 | 3 |
| Total % | | 100 | 100 | 100 |
| Viscosity (cP) at 23° C. | | 9.46 | 9.75 | 9.84 |

Viscosity

The viscosity measurements showed that the high viscosity latexes (Examples 1 and 4) were able to bring the viscosity of the aqueous inkjet ink compositions to the levels useful for inkjet printing (9-10 cP at 23° C.) without requiring any water-soluble resin. The room temperature viscosity of the aqueous inkjet ink composition made using the latex of Example 1 as measured after about 40 days (e.g. ±12 hours) was the same as the room temperature viscosity measured on day 1 (i.e., the initial viscosity shown in Table 3). The room temperature viscosity of the aqueous inkjet ink composition was also measured after about 3 days (e.g. ±12 hours) in an about 60° C. (±e.g., 5° C.) oven. The viscosity was the same as the room temperature viscosity as measured on day 1, indicating excellent stability. By "same," it is meant within ±1%.

Dry and Wet Rub Resistance

The aqueous inkjet ink compositions were tested for dry rub resistance (30 double-rubs using dry Q-tip) and wet rub resistance (20 double-rubs using wet Q-tip) (water-fastness). A thin layer of each inkjet ink composition (wire-wound rods RDS 2.5) was coated on McCoy gloss #100 paper and then dried in a convection oven at 130° C. for 2 min. Both wet and dry rub resistances are much higher for inkjet ink compositions made using the latexes of Examples 1 and 4 than for those made using the latex of comparative Example 5 and a commercial inkjet ink composition.

Additional experiments were conducted using aqueous inkjet ink compositions similar to those shown in Table 3, but replacing the Michem Lube 190 wax (nanosized, anionic wax emulsion) with other types of waxes which were not both nanosized, anionic wax emulsions. As compared to these other waxes, the Michem Lube 190 wax provided superior dry and wet rub resistance. The aqueous inkjet ink composition prepared using this wax was also able to pass a tape test while the others were not. In the tape test, a piece of scotch tape was fully pressed and adhered on the surface of dried ink, 20 seconds were allowed to pass, and the tape was quickly detached. Passing the test is indicated by no ink transferring to the tape. Failing the test is indicated by some or all of the ink being transferred to the tape.

Printing Performance

The inkjet ink compositions were jetted using a Dimatix DMP2800 printer on different paper substrates, including Kodak photo paper, McCoy® gloss #100 and Xerox® Bold. A first set of test key parameters used were as follows: Drop mass=4.5-4.8 ng (i.e., about 4.5 ng), Drop velocity=6-7 m/s, frequency=5 kHz, voltage=16-20 V, printing temperature was 20° C. to 40° C. A second set of test key parameters used were as follows: Drop mass=8.5-9 ng (i.e., about 9 ng), Drop velocity=9-11 m/s, frequency=5 kHz, voltage=24-27 V, printing temperature was 20° C. to 40° C. The print parameter was a 600×600 dpi print. The measurement was done using a PIAS II instrument, which is a personal image analysis system with a digital loupe. The high-resolution optic module ~5 µm/pixel was used which has a field view of ~3.2 mm×2.4 mm to measure the dot size and diameter. The results are shown in Tables 4 (first set) and 5 (second set) In addition, the inkjet ink composition made using the latex of Example 1 passed continuous jetting for >2.5 hours during which the faceplate was clean and the nozzles did not clog. The ink drops also maintained round and circular shapes.

TABLE 4

Printing Performance and Water Fastness of Aqueous Inkjet Ink Compositions (4.5 ng ink drop).

| Substrate | | Latex of Example 1 | Latex of Comparative Example 5 | Comparative Commercial Inkjet Ink Composition |
|---|---|---|---|---|
| McCoy Gloss | | Dot Diameter = 48.23 µm | Dot Diameter = 49.3 µm | Dot Diameter = 52.23 µm |
| | | Dot Circularity = 0.9 | Dot Circularity = 0.9 | Dot Circularity = 0.9 |
| | | Mottle = 0.43 | Mottle = 0.27 | Mottle = 0.5 |
| | | Graininess = 3.4 | Graininess = 1.40 | Graininess = 3.43 |
| | | Line Width = 0.042 mm | Line Width = 0.041 mm | Line Width = 0.048 mm |
| Xerox Bold | | Dot Diameter = 54.10 µm | Dot Diameter = 55.3 µm | Dot Diameter = 49.13 µm |
| | | Dot Circularity = 1.1 | Dot Circularity = 1.13 | Dot Circularity = 1.17 |
| | | Mottle = 0.4 | Mottle = 0.4 | Mottle = 0.57 |
| | | Graininess = 2.3 | Graininess = 1.67 | Graininess = 2.40 |
| | | Line Width = 0.055 mm | Line Width = 0.057 mm | Line Width = 0.057 mm |
| McCoy Gloss | | OD = 1.006 | OD = 1.306 | OD = 0.914 |
| | | L* = 62.67 | L* = 57.93 | L* = 65.12 |
| | | a* = −30.79 | a* = −35.04 | a* = −29.20 |
| | | b* = −47.59 | b* = −52.56 | b* = −45.95 |

TABLE 4-continued

Printing Performance and Water Fastness of Aqueous Inkjet Ink Compositions (4.5 ng ink drop).

| Substrate | Latex of Example 1 | Latex of Comparative Example 5 | Comparative Commercial Inkjet Ink Composition |
|---|---|---|---|
| Xerox Bold | OD = 0.902<br>L* = 64.02<br>a* = −27.56<br>b* = −45.56 | OD = 0.993<br>L* = 62.10<br>a* = −28.03<br>b* = −49.85 | OD = 0.786<br>L* = 67.49<br>a* = −24.15<br>b* = −45.55 |
| Water Fastness Double Rubs | 16 | 6 | 11 |

TABLE 5

Printing Performance and Water-Fastness of Aqueous Inkjet Ink Compositions (9 ng ink drop).

| Substrate | Latex of Example 1 | Latex of Comparative Example 5 | Comparative Commercial Inkjet Ink Composition |
|---|---|---|---|
| McCoy Gloss | Mottle = 0.33<br>Graininess = 2.43<br>Line Width = 0.052 mm | Mottle = 0.1<br>Graininess = 0.33<br>Line Width = 0.054 mm | Mottle = 0.47<br>Graininess = 2.23<br>Line Width = 0.058 mm |
| Xerox Bold | Mottle = 0.5<br>Graininess = 1.27<br>Line Width = 0.066 mm | Mottle = 0.3<br>Graininess = 1.33<br>Line Width = 0.066 mm | Mottle = 0.33<br>Graininess = 1.47<br>Line Width = 0.069 mm |
| McCoy Gloss | OD = 1.288<br>L* = 55.59<br>a* = −30.98<br>b* = −53.31 | OD = 1.769<br>L* = 48.12<br>a* = −30.15<br>b* = −59.13 | OD = 1.222<br>L* = 57.56<br>a* = −30.55<br>b* = −52.74 |
| Xerox Bold | OD = 1.064<br>L* = 58.38<br>a* = −25.28<br>b* = −51.35 | OD = 1.126<br>L* = 56.15<br>a* = −24.43<br>b* = −52.93 | OD = 0.960<br>L* = 61.31<br>a* = −23.47<br>b* = −51.03 |
| Water Fastness Double Rubs | 34 | 8 | 16 |

The results show that although the aqueous inkjet ink composition made from the latex of Example 1 does not include a water-soluble resin, the printing performance is comparable to or better than that of the comparative inkjet ink compositions, indicating excellent film formation abilities. At the same time, the water-fastness of the aqueous inkjet ink composition made from the latex of Example 1 is significantly greater than that of the comparative inkjet ink compositions. Specifically, it is 3 to 4 times better than the aqueous inkjet ink composition made from the latex of Comparative Example 5. Thus, the present disclosure encompasses aqueous inkjet ink compositions exhibiting a wet rub resistance of at least 10, 15, or 20 as measured using an about 4.5 ng drop of the ink and as described above or exhibiting a wet rub resistance of at least 25, 30, or 35 as measured using an about 9 ng drop of the ink and as described above.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. An aqueous inkjet ink composition comprising water; resin particles; a colorant; and optionally, a wax, wherein the resin particles comprise a polymerization product of reactants comprising a monomer, an acidic monomer, a hydrophilic monomer, a difunctional monomer, and a reactive surfactant, wherein the acidic monomer, the hydrophilic monomer, and the difunctional monomer, together, are present at an amount in a range of from about 10 weight % to about 30 weight % in the resin particles, wherein the acidic monomer is a combination of styrenesulfonic acid and methacrylic acid, and further wherein, a total amount of the acidic monomer is present at an amount in a range of from 10 weight % to 15 weight %.

2. The aqueous inkjet ink composition of claim 1, wherein the amount of the acidic monomer, the hydrophilic monomer, and the difunctional monomer, together, is from about 15 weight % to about 30 weight % in the resin particles.

3. The aqueous inkjet ink composition of claim 1, wherein the aqueous inkjet ink composition is free of a binder resin other than the resin particles.

4. The aqueous inkjet ink composition of claim 1, comprising the wax, wherein the wax is a nanoscale, anionic wax emulsion.

5. The aqueous inkjet ink composition of claim 1, wherein the hydrophilic monomer comprises a hydroxyl moiety, a glycol moiety, or both.

6. The aqueous inkjet ink composition of claim 1, wherein the hydrophilic monomer is selected from hydroxyethyl (meth)acrylate, n-hydroxyethyl (meth)acrylamide, hydroxypropyl (metha)crylate, hydroxypropyl (meth)acrylamide, ethylene glycol (meth)acrylate, propylene glycol (meth)acrylate, a poly(ethylene glycol) (meth)acrylate, and a poly(propylene glycol) (meth)acrylate.

7. The aqueous inkjet ink composition of claim 1, wherein the hydrophilic monomer is a poly(ethylene glycol) methacrylate having a molecular weight in a range of from about 185 g/mol to about 1500 g/mol.

8. The aqueous inkjet ink composition of claim 7, wherein the molecular weight is in a range of from about 360 g/mol to about 1500 g/mol.

9. The aqueous inkjet ink composition of claim 1, wherein the difunctional monomer is a poly(ethylene glycol) diacrylate.

10. The aqueous inkjet ink composition of claim 1, wherein the reactants comprise styrene, an alkyl acrylate, the methacrylic acid, the styrenesulfonic acid, a poly(ethylene glycol) methacrylate, a polyethylene glycol diacrylate, and an anionic ether sulfate reactive surfactant.

11. The aqueous inkjet ink composition of claim 1, wherein the difunctional monomer is present at an amount in a range of from about 0.01 weight % to about 0.8 weight % in the resin particles.

12. The aqueous inkjet ink composition of claim 1, wherein the resin particles, dispersed in water at a solids content of about 30%, are characterized by a room temperature viscosity in a range of from about 10 cP to about 100 cP.

13. The aqueous inkjet ink composition of claim 12, wherein the room temperature viscosity is in a range of from about 10 cP to about 40 cP.

14. The aqueous inkjet ink composition of claim 1, wherein the reactants consist of one or more types of the monomer, one or more types of the acidic monomer, one or more types of the hydrophilic monomer, one or more types of the difunctional monomer, one or more types of the reactive surfactant, one or more types of a chain transfer agent, and optionally, one or more types of an initiator.

15. The aqueous inkjet ink composition of claim 1, wherein the reactants consist of styrene, an alkyl acrylate, the methacrylic acid, the styrenesulfonic acid, a poly(ethylene glycol) methacrylate, a polyethylene glycol diacrylate, an anionic ether sulfate reactive surfactant, a chain transfer agent, and optionally, an initiator.

16. The aqueous inkjet ink composition of claim 1, further comprising silica nanoparticles bound to the hydrophilic monomer.

17. The aqueous inkjet ink composition of claim 1, comprising a nanoscale, anionic wax emulsion, wherein the aqueous inkjet ink composition exhibits a wet rub resistance of at least about 10 double-rubs using a wet Q-tip as measured using an about 4.5 ng drop of the aqueous inkjet ink composition; a wet rub resistance of at least about 25 double-rubs using a wet Q-tip as measured using an about 9 ng drop of the aqueous inkjet ink composition; or both.

18. The aqueous inkjet ink composition of claim 1, wherein the aqueous inkjet ink composition exhibits a viscosity as measured at room temperature after about 40 days at room temperature that is the same as an initial viscosity; a viscosity as measured at room temperature after about 3 days at about 60° C. that is the same as an initial viscosity; or both.

19. The aqueous inkjet ink composition of claim 1, wherein the hydrophilic monomer is hydroxyethyl (meth)acrylate or a poly(ethylene glycol) (meth)acrylate, and a total amount of the hydrophilic monomer is present at an amount in a range of from 5 weight % to 15 weight %.

20. The aqueous inkjet ink composition of claim 15, wherein the poly(ethylene glycol) methacrylate is present at an amount in a range of from 5 weight % to 15 weight %.

* * * * *